(12) United States Patent
Oe et al.

(10) Patent No.: US 8,407,336 B2
(45) Date of Patent: Mar. 26, 2013

(54) SUPPORTING APPARATUS FOR ANALYZING COMPUTER OPERATION STATUS

(75) Inventors: Kazuichi Oe, Kawasaki (JP); Tatsuo Kumano, Kawasaki (JP); Yasuo Noguchi, Kawasaki (JP); Yoshihiro Tsuchiya, Kawasaki (JP); Kazutaka Ogihara, Kawasaki (JP); Masahisa Tamura, Kawasaki (JP); Tetsutaro Maruyama, Kawasaki (JP); Takashi Watanabe, Kawasaki (JP); Minoru Kamoshida, Kawasaki (JP); Shigeyuki Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 163 days.

(21) Appl. No.: 12/362,246

(22) Filed: Jan. 29, 2009

(65) Prior Publication Data

US 2009/0282287 A1    Nov. 12, 2009

(30) Foreign Application Priority Data

May 8, 2008   (JP) ................................. 2008-122197

(51) Int. Cl.
*G06F 15/173* (2006.01)
*G06F 11/00* (2006.01)
*G06F 9/44* (2006.01)

(52) U.S. Cl. ........................................ 709/224; 714/47.1

(58) Field of Classification Search ........................ None
See application file for complete search history.

(56) References Cited

U.S. PATENT DOCUMENTS

| | | | |
|---|---|---|---|
| 7,194,664 B1* | 3/2007 | Fung et al. ...................... 714/45 |
| 7,328,127 B2* | 2/2008 | Otsuka et al. ................. 702/182 |
| 7,822,844 B2* | 10/2010 | Oulu et al. ..................... 709/224 |
| 2005/0039172 A1* | 2/2005 | Rees et al. ..................... 717/130 |
| 2006/0015512 A1* | 1/2006 | Alon et al. ..................... 707/100 |
| 2006/0015612 A1* | 1/2006 | Shimazaki et al. ........... 709/224 |
| 2007/0022327 A1* | 1/2007 | Otsuka et al. .................... 714/47 |
| 2008/0016412 A1* | 1/2008 | White et al. ..................... 714/48 |
| 2008/0104230 A1* | 5/2008 | Nasuto et al. ................. 709/224 |
| 2008/0235365 A1* | 9/2008 | Bansal et al. ................. 709/224 |

FOREIGN PATENT DOCUMENTS

| | | |
|---|---|---|
| JP | A 6-28326 | 2/1994 |
| JP | 8-249261 | 9/1996 |
| JP | 2005-346414 | 12/2005 |

OTHER PUBLICATIONS

Japanese office action issued in corresponding Japanese App. No. 2008-122197, dated May 1, 2012.

* cited by examiner

*Primary Examiner* — Wen-Tai Lin
(74) *Attorney, Agent, or Firm* — Greer, Burns & Crain, Ltd.

(57) ABSTRACT

Processing time required from transmission of a request packet including a processing request from a client, until return of a reply packet in which internal information including an operation status of a plurality of servers is added to an execution result of processing corresponding to the processing request, obtained by the servers in cooperation with each other, is calculated by a function incorporated beforehand in the respective servers. Moreover, the internal information added to the reply packet is extracted and stored in an internal information DB in association with the calculated required time of the processing. Furthermore predetermined statistical processing is performed with respect to the internal information and the required time associated with the internal information stored in the internal information DB to analyze the operation status of the plurality of servers.

12 Claims, 20 Drawing Sheets

FIG. 11

| | | |
|---|---|---|
| INTERNAL INFORMATION OF SERVER 10 | SERVER | SERVER 10 |
| | FUNCTION | WRITE PROCESSING |
| | NUMBER OF CONTENT ENTRIES | 4 |
| | DISK IO PROCESSING TIME | AAA us |
| | LOCK WAITING PROCESSING TIME | BBB us |
| | METADATA UPDATE PROCESSING TIME | CCC us |
| | PROTOCOL GENERATION PROCESSING TIME | DDD us |
| INTERNAL INFORMATION OF SERVER 20 | SERVER | SERVER 20 |
| | FUNCTION | WRITE PROCESSING |
| | NUMBER OF CONTENT ENTRIES | 4 |
| | DISK IO PROCESSING TIME | JJJ us |
| | LOCK WAITING PROCESSING TIME | KKK us |
| | METADATA UPDATE PROCESSING TIME | LLL us |
| | PROTOCOL GENERATION PROCESSING TIME | MMM us |

FIG. 12

| SERVER | SERVER 10 |
|---|---|
| FUNCTION | READ PROCESSING |
| NUMBER OF CONTENT ENTRIES | 4 |
| DISK IO PROCESSING TIME | EEE us |
| LOCK WAITING PROCESSING TIME | FFF us |
| METADATA UPDATE PROCESSING TIME | GGG us |
| PROTOCOL GENERATION PROCESSING TIME | HHH us |
| SERVER | SERVER 20 |
| FUNCTION | READ PROCESSING |
| NUMBER OF CONTENT ENTRIES | 4 |
| DISK IO PROCESSING TIME | NNN us |
| LOCK WAITING PROCESSING TIME | PPP us |
| METADATA UPDATE PROCESSING TIME | QQQ us |
| PROTOCOL GENERATION PROCESSING TIME | RRR us |

INTERNAL INFORMATION OF SERVER 10

INTERNAL INFORMATION OF SERVER 20

FIG. 16

| | | |
|---|---|---|
| INTERNAL INFORMATION OF SERVER 10 | SERVER | SERVER 10 |
| | FUNCTION | WRITE PROCESSING |
| | NUMBER OF CONTENT ENTRIES | 3 |
| | NUMBER OF EMPTY THREADS | AAA |
| | NUMBER OF IO WAITING | BBB |
| | NUMBER OF EMPTY QUEUES | CCC |
| INTERNAL INFORMATION OF SERVER 20 | SERVER | SERVER 20 |
| | FUNCTION | WRITE PROCESSING |
| | NUMBER OF CONTENT ENTRIES | 3 |
| | NUMBER OF EMPTY THREADS | GGG |
| | NUMBER OF IO WAITING | HHH |
| | NUMBER OF EMPTY QUEUES | JJJ |

FIG. 17

| | | |
|---|---|---|
| INTERNAL INFORMATION OF SERVER 10 | SERVER | SERVER 10 |
| | FUNCTION | READ PROCESSING |
| | NUMBER OF CONTENT ENTRIES | 3 |
| | NUMBER OF EMPTY THREADS | DDD |
| | NUMBER OF IO WAITING | EEE |
| | NUMBER OF EMPTY QUEUES | FFF |
| INTERNAL INFORMATION OF SERVER 20 | SERVER | SERVER 20 |
| | FUNCTION | READ PROCESSING |
| | NUMBER OF CONTENT ENTRIES | 3 |
| | NUMBER OF EMPTY THREADS | KKK |
| | NUMBER OF IO WAITING | LLL |
| | NUMBER OF EMPTY QUEUES | MMM |

FIG. 19

COMBINATION OF CONTENTS IN KERNEL STATE IN CASE OF WRITE PROCESSING 50 ms

| SERVER 10 | | | SERVER 20 | | | PROPORTION (%) |
|---|---|---|---|---|---|---|
| NUMBER OF EMPTY THREADS | NUMBER OF EMPTY QUEUES | NUMBER OF IO WAITING | NUMBER OF EMPTY THREADS | NUMBER OF EMPTY QUEUES | NUMBER OF IO WAITING | |
| 0 | 0 | 1-50 | 1-10 | 1-20 | 0 | 61 |
| 1-10 | 1-20 | 0 | 0 | 0 | 1-50 | 31 |
| 0 | 0 | 1-50 | 0 | 0 | 1-50 | 8 |

SUPPORTING APPARATUS FOR ANALYZING COMPUTER OPERATION STATUS

CROSS-REFERENCE TO RELATED APPLICATION

This application is based upon and claims the benefit of priority of the prior Japanese Patent Application No. 2008-122197 filed on May 8, 2008, the entire contents of which are incorporated herein by reference.

FIELD

The embodiment discussed herein is directed to a technique for analyzing an operation status in a computer system.

BACKGROUND

Recently, the role played by computer systems in society is increasing, the configuration thereof is becoming more complicated, and the amount of processing data is also increasing. Moreover, in such computer systems, further improvement in processing speed and improvement of reliability are demanded. Therefore, in order to cope with such a request, a computer system in which a plurality of computers cooperates with each other to perform processing with respect to one processing request has been adopted.

However, in the case where such a plurality of computers cooperates with each other to execute processing corresponding to one processing request, if a problem such as a processing delay occurs, it is difficult to specify which computer causes the problem. Therefore, as a technique for analyzing the operation status of respective computers when the plurality of computers cooperates with each other to execute processing, the following technique has been proposed. That is to say, in a configuration in which the processing is derived (distributed) from one computer (computer 1) to another computer (computer 2), the computer 1 generates statistical information of processing in its own apparatus and stores the information. On the other hand, the computer 2 generates statistical information of processing in its own apparatus, and to the generated statistical information, adds information indicating that the processing is distributed from the computer 1, and stores this information. Then at a stage of analyzing the operation status of these computers, the pieces of statistical information stored in respective computers are associated with each other (for example, refer to Japanese Laid-open Patent Publication No. 06-28326).

However in such a technique, it becomes a prerequisite that the statistical information has already been generated and stored for each computer at the stage of analyzing the operation status of the computers. That is to say, analysis is performed based on the statistical information, which has been obtained by the repeated execution of the processing and stored for each computer. Therefore, operation status of each of the computers 1 and 2 cannot be specified in the respective processing with respect to each one of the processing requests, as described below.

For example, in the above technique, it is assumed that a cause of delay in each computer is analyzed in a case when the processing time performed by the computer 1 and the computer 2 in cooperation with each other is 1 ms. In this case, it is assumed that as a result of generation of the statistical information on each computer, the computer 1 can specify that cause A accounts for 60% and cause B accounts for 40% as the probability occupied by each cause of delay. On the other hand, it is assumed that the computer 2 can specify that cause C accounts for 20% and cause D accounts for 80%. From these pieces of information, the cause of delay in each computer can be respectively specified as statistical results for a plurality of processing. However, for example, in one processing in which cause A has occurred in the computer 1, it cannot be specified what cause of delay has occurred in the computer 2 that has executed this processing in cooperation with the computer 1, because the statistical information has been generated beforehand for each computer.

Thus, according to the technique, although the operation status of each computer can be analyzed respectively, combined analysis of the status of the plurality of computers is difficult, and there is a limitation to the contents that can be analyzed.

SUMMARY

According to an aspect of the embodiment, processing time required from transmission of a request packet including a processing request, until return of a reply packet, in which internal information including the operation status of a plurality of computers is added to an execution result of processing corresponding to the processing request, obtained by the plurality of computers in cooperation with each other, by a function incorporated beforehand in the plurality of computers, is calculated. Moreover, the internal information of the plurality of computers added to the reply packet is extracted, and stored in a memory in association with the calculated processing time. Furthermore, predetermined statistical processing is performed with respect to the internal information and the processing time associated with the internal information stored in the memory, so as to analyze the operation status of the plurality of computers.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 11 is an explanatory drawing of a structure of the internal information in the reply packet in an example of collecting contents of processing in write processing and the processing time thereof;

FIG. 12 is an explanatory drawing of a structure of the internal information in the reply packet in an example of collecting contents of processing in read processing and the processing time thereof;

FIG. 16 is an explanatory drawing of a structure of the internal information in the reply packet in an example of collecting kernel information in the write processing;

FIG. 17 is an explanatory drawing of a structure of the internal information in the reply packet in an example of collecting the kernel information in the read processing;

FIG. 19 is an explanatory drawing of a combination of contents of a kernel state in the case of write processing 50 ms.

DESCRIPTION OF EMBODIMENTS

Figure 1:
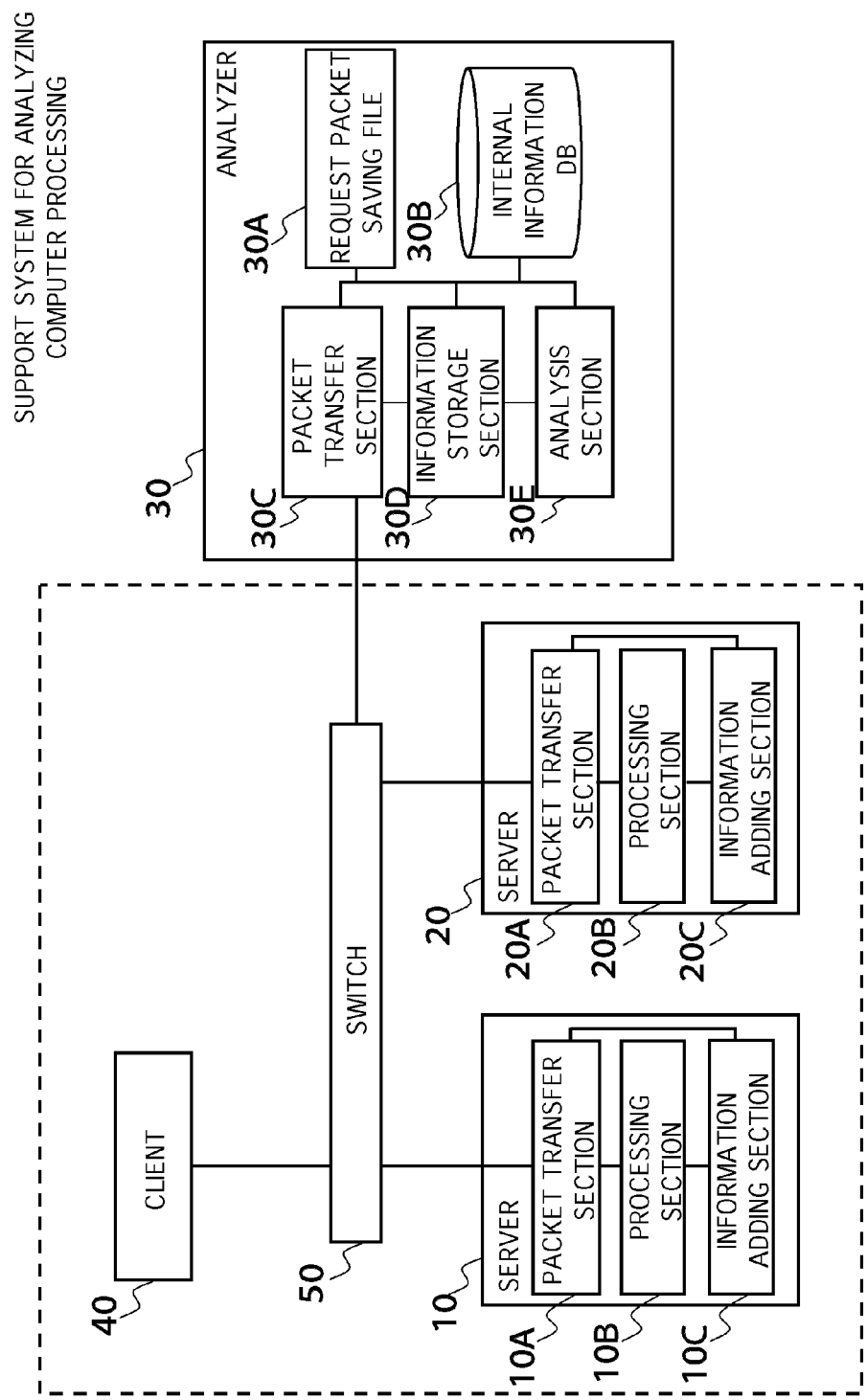
FIG. 1 is a block diagram of a system for analyzing computer processing.

FIG. 1 is an overall block diagram of a system for analyzing computer processing. The system for analyzing computer processing includes; a server 10, a server 20, an analyzer 30, a client 40, and a switch 50. The server 10, the server 20, the analyzer 30, and the client 40 are computers including at least a central processing unit (CPU) and a memory, and these are connected to each other by a network via the switch 50. Moreover, the switch 50 includes a normal switching function, and also includes a port mirroring function. Furthermore, the switch 50 performs port-mirroring of a request packet including a processing request transmitted from the client 40 to the server 10 and a reply packet returned from the server 10 to the client 40 to send to the analyzer 30. Moreover in this system, the server 10 and the server 20 execute processing in cooperation with each other, with respect to the processing request from the client 40. At this time, the processing is distributed from the server 10 to the server 20.

The server 10 includes: a packet transfer section 10A that allows a packet to be transmitted to and/or received from other computers; a processing section 10B that executes processing corresponding to the processing request upon reception of a request packet including the processing request, to thereby generate a reply packet reflecting a processing result obtained thereby; and an information adding section 10C that adds at least information indicating an operation status of its own apparatus to the reply packet. It is to be noted that a program recorded on a computer readable recording medium is installed onto the server 10 and is executed to realize the packet transfer section 10A, the processing section 10B and the information adding section 10C.

The server 20 has the same configuration as that of the server 10, and includes; a packet transfer section 20A, a processing section 20B, and an information adding section 20C, respectively corresponding to the packet transfer section 10A, the processing section 10B, and the information adding section 10C in the server 10. It is to be noted that a program recorded on a computer readable recording medium is installed onto the server 20 and is executed to realize the packet transfer section 20A, the processing section 20B and the information adding section 20C.

The analyzer 30 includes: a request packet saving file 30A that saves the port-mirrored request packet from the switch 50; an internal information database (hereinbelow referred to as "DB") 30B for accumulating the internal information including information indicating the operation status of both the server 10 and the server 20 and processing time calculated from a difference in reception times of the request packet and the reply packet, which are added to the reply packet port-mirrored from the switch 50; a packet reception section 30C that receives the request packet and the reply packet; an information storage section 30D that stores the internal information added to the reply packet and the processing time, in the internal information DB 30B; and an analysis section 30E that analyzes the status of the server 10 and the server 20 by using the internal information and the processing time stored in the internal information DB 30B. The information storage section 30D of the analyzer 30 realizes a calculation step, a calculation device, an extraction step, an extraction device, a storage step, and a storage device. Furthermore, the analysis section 30E realizes an analysis step, an analysis device, an output step, and an output device. It is to be noted that a program recorded on a computer readable recording medium such as a CD-ROM, a DVD-ROM, a floppy disk, a magnetic tape or the like is installed onto the analyzer 30 and is executed to realize the packet reception section 30C, the information storage section 30D and the analysis section 30E.

The client 40 transmits a request packet requesting processing to the server 10, and receives a reply packet from the server 10.

The switch 50 designates a port connected to the analyzer 30 as a mirror port, and port-mirrors the request packet transmitted from the client 40 to the server 10, and the reply packet returned from the server 10 to the client 40, to send to the analyzer 30.

Figure 2:
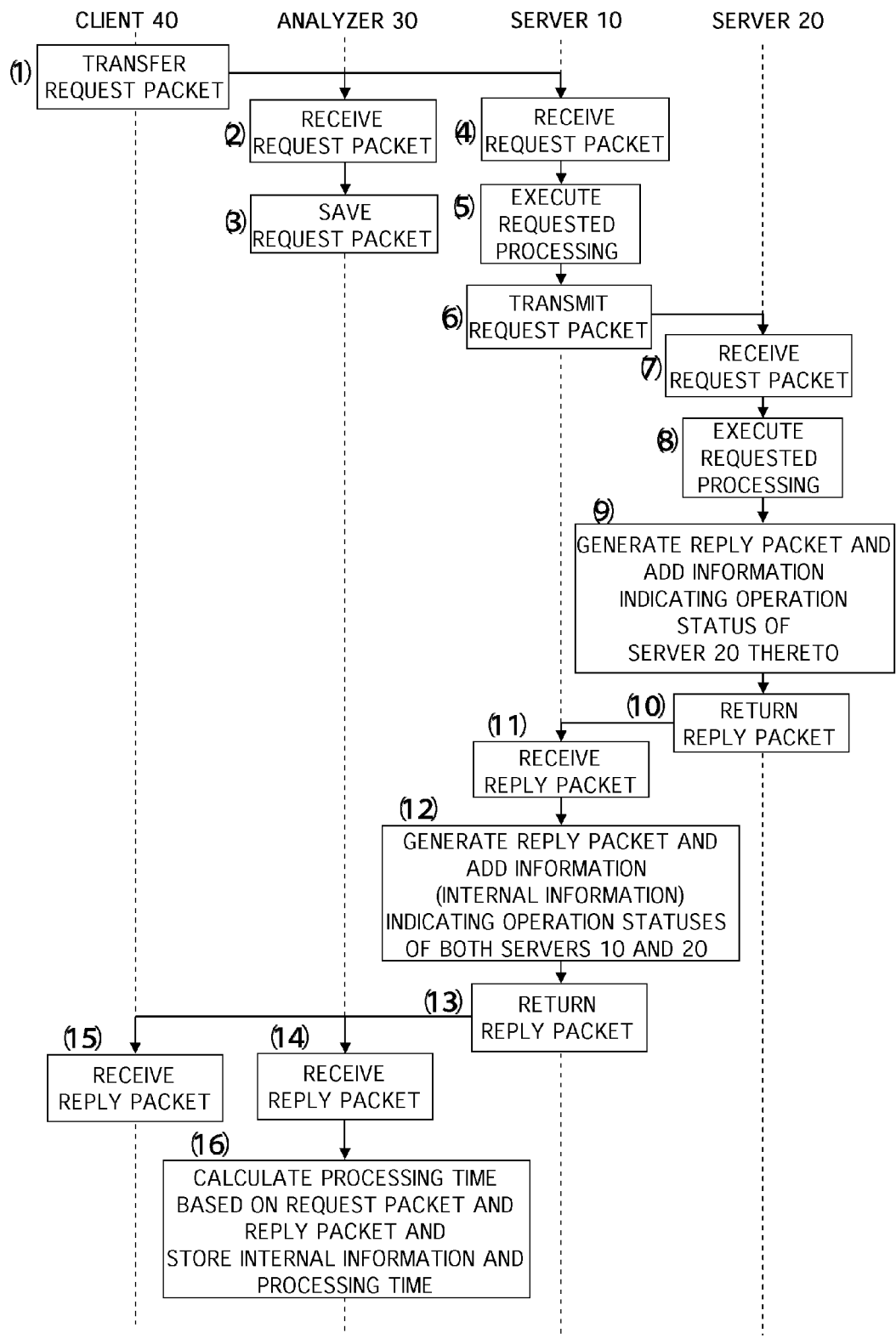
FIG. 2 is an explanatory drawing of a flow of processing between respective servers, an analyzer, and a client.

FIG. 2 is a diagram illustrating a flow of processing in the server 10, the server 20, the analyzer 30, and the client 40.

The client 40 transmits the request packet including the processing request to the server 10 (1). The request packet is port-mirrored to the analyzer 30 by the switch 50. Then the analyzer 30 receives the request packet (2), and saves this in the request packet saving file 30B (3). On the other hand, the server 10 receives the request packet (4) and executes the requested processing (5), and transmits the request packet to the server 20 in order to distribute the processing (6). The server 20 receives the request packet (7) and executes the requested processing (8). Then the server 20 generates a reply packet and adds information indicating the operation status of the server 20 thereto (9), and returns this to the server 10 (10). The server 10 receives the reply packet to which has been added the information indicating the operation status of the server 20 (11). Then the server 10 generates a reply packet and adds thereto internal information including the information indicating the operation status of the server 10 and the information indicating the operation status of the server 20 included in the reply packet received from the server 20 (12), and returns the reply packet to the client 40 (13). The returned reply packet is port-mirrored to the analyzer 30 by the switch 50 so that it is received by the analyzer 30 (14) and is received by the client 40 (15). Then the analyzer 30 calculates the processing time of the processing performed by the server 10 and the server 20 in cooperation with each other, based on the respective reception times of the received reply packet and the request packet saved in the request packet saving file 30A. Furthermore the analyzer 30 stores the calculated processing time in the internal information DB 30B in association with the internal information of the server 10 and the server 20, and analyzes the operation statuses of the respective servers based on the stored information (16).

Hereinafter, a structure of the reply packet returned from the server 10 to the client 40, that is, the reply packet to which is added the internal information of the server 10 and the server 20 will be explained as compared to a conventional reply packet.

Figure 3:
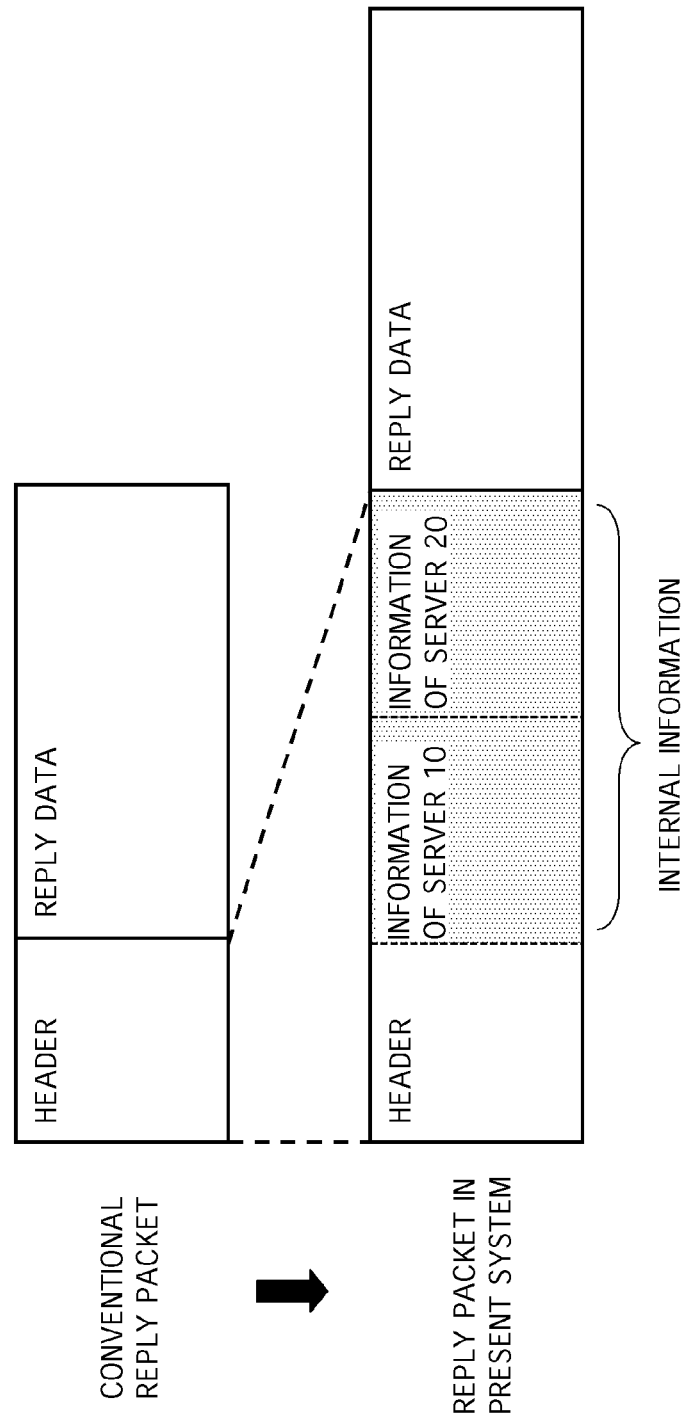
FIG. 3 is an explanatory drawing of a structure of a reply packet.

The conventional reply packet includes, as illustrated in FIG. 3, a header and reply data. The header of the reply packet includes sender IP address, sender port number, destination IP address, destination port number, and IO size.

Figure 4:
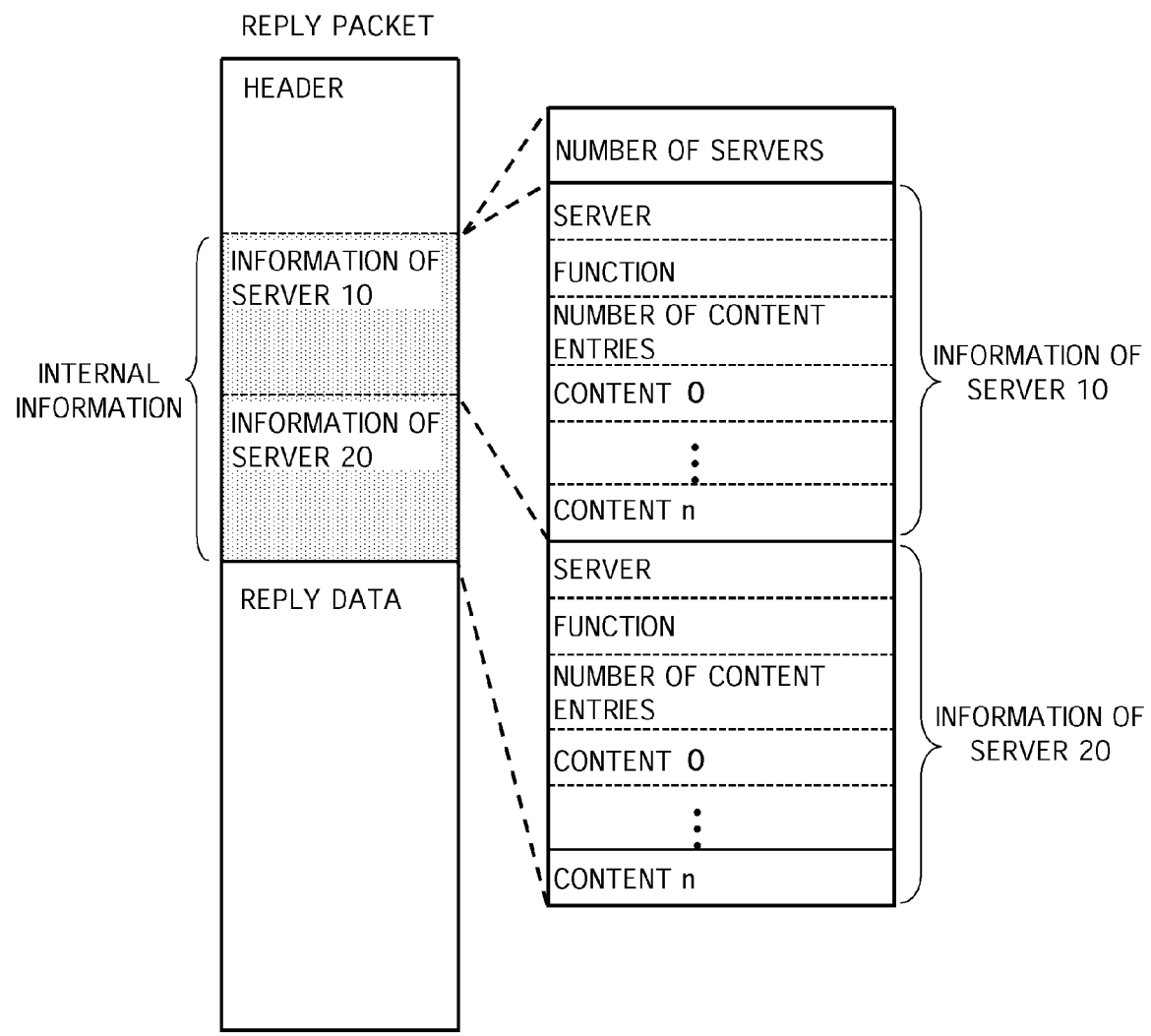
FIG. 4 is an explanatory drawing of a structure (including a detailed structure of internal information) of the reply packet.

On the other hand, in the present system, as illustrated in FIG. 3, in the reply packet returned from the server 10 to the client 40, the information indicating the operation status of the server 10 and the server 20 is added to the header, which is the same as in the conventional request packet, as the internal information. Moreover, FIG. 4 illustrates one example of a detailed structure of the internal information. The internal information of these servers includes the number of servers (two in the system; namely the server 10 and the server 20) in which the internal information is inserted, at the head of the information. Furthermore the internal information includes, for each server, information of server for identifying which server information it is, information of a function for specifying a function realized by the processing, and for the contents of the internal information associated with each function, the number of content entries for defining the number of contents, and the contents of the specific internal information. The number of functions that can be included in the information of the respective servers can be changed as required. Moreover the number of contents that can be included in one function can be also changed as required. In this manner, the data structure can be changed matched with the number of functions included in the processing executed by the respective servers, and the number of contents in the internal information associated with the function, thereby enabling to be applied to analysis of various processing. Furthermore it may be required to collect many pieces of information indicating, for example, the kernel state according to the configuration of the server to be analyzed. However, also in such a case, all the required pieces of information can be collected.

Next the processing executed by the server 10, the server 20, and the analyzer 30 are respectively explained.

Figure 5:
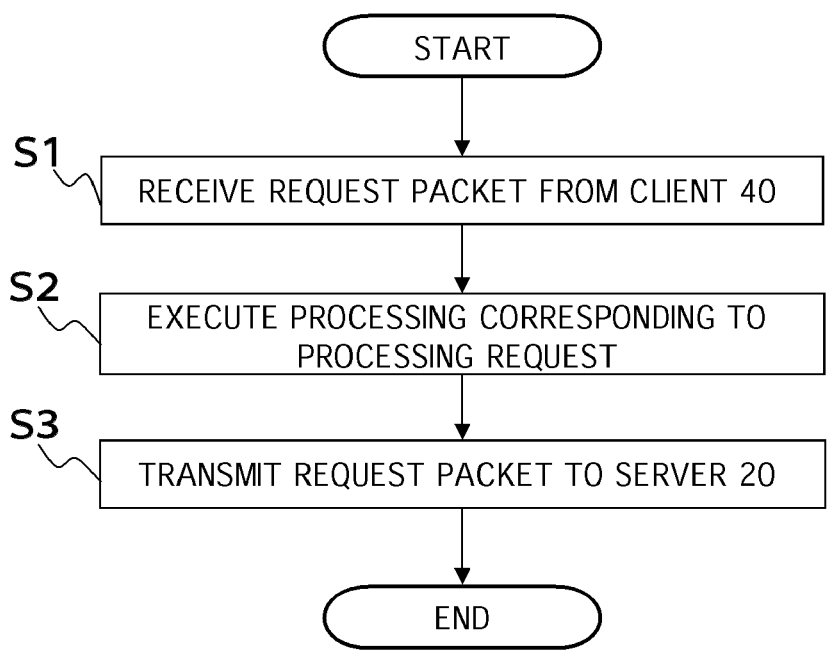
FIG. 5 is a flowchart illustrating first processing of one server.

FIG. 5 illustrates the contents of first processing in the server 10. The first processing in the server 10 is executed every time the server 10 receives the request packet from the client 40 in the packet transfer section 10A.

In step 1 (abbreviated to "S1" in the figure, and similarly hereunder), the request packet from the client 40 is received in the packet transfer section 10A.

In step 2, the processing section 10B executes the processing corresponding to the processing request of the received request packet.

In step 3, the processing section 10B generates a request packet with respect to the server 20, for distributing the processing to the server 20, and the packet transfer section 10A transmits the request packet to the server 20.

Figure 6:
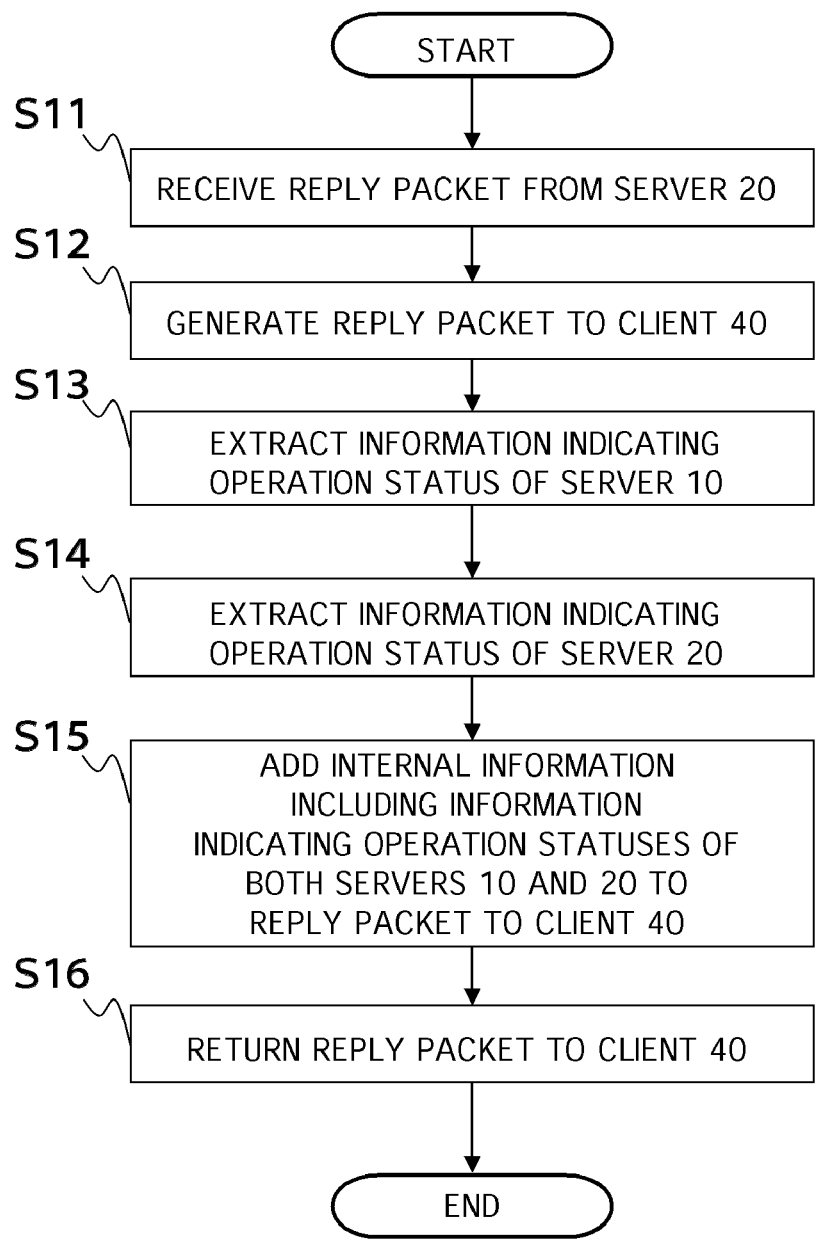
FIG. 6 is a flowchart illustrating second processing of one server.

FIG. 6 illustrates the contents of second processing in the server 10. The second processing in the server 10 is executed every time the packet transfer section 10A receives the reply packet to which is added the internal information in the server 20.

In step S11, the packet transfer section 10A receives the reply packet to which is added information indicating the operation status of the server 20.

In step 12, the processing section 10B generates a reply packet to be transmitted to the client 40.

In step 13, the information adding section 10C extracts the information indicating the operation status of the server 10 in the processing corresponding to the processing request.

In step 14, the information adding section 10C extracts the information indicating the operation status of the server 20 added to the reply packet received from the server 20.

In step 15, the information adding section 10C adds the internal information including the extracted information indicating the operation statuses of both the server 10 and the server 20.

In step 16, the packet transfer section 10A returns the reply packet to which is added the internal information, to the client 40.

Figure 7:
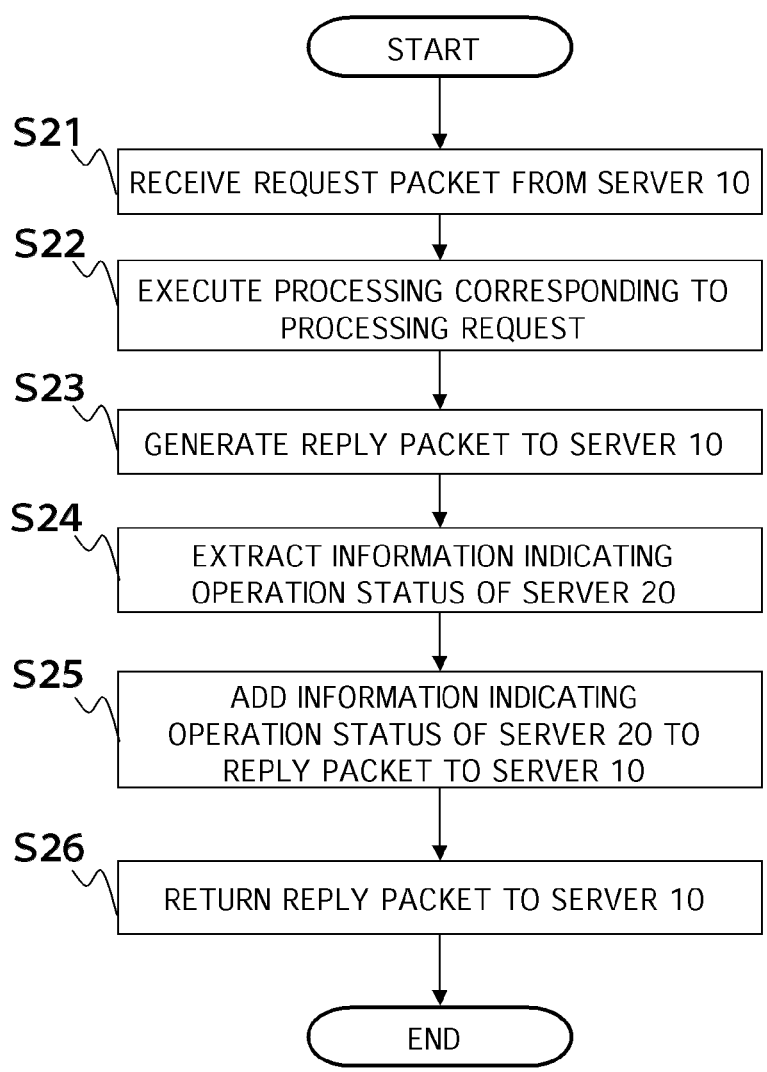
FIG. 7 is a flowchart illustrating processing of another server.

FIG. 7 illustrates the processing content in the server 20. The processing in the server 20 is executed every time the packet transfer section 20A receives the request packet from the server 10.

In step 21, the request packet from the server 10 is received in the packet transfer section 20A.

In step 22, the processing section 20B executes the processing corresponding to the processing request in the received request packet.

In step 23, the processing section 20B generates a reply packet to be transmitted to the server 10.

In step 24, the information adding section 20C extracts the information indicating the operation status of the server 20 in the processing corresponding to the processing request.

In step 25, the information adding section 20C adds information indicating the extracted operation status to the reply packet.

In step 26, the packet transfer section 20A returns the reply packet to which is added the information indicating the operation status of the server 20, to the server 10.

By the processing executed by the server 10 and the server 20, the internal information including the information indicating the operation statuses of the server 10 and the server 20 is added to the reply packet to be returned from the server 10 to the client 40 for each processing corresponding to the processing request from the client 40. Then the reply packet to be returned from the server 10 to the client 40 is port-mirrored to the analyzer 30 by the switch 50, so that the analyzer 30 can collect the internal information for each processing corresponding to the respective processing requests.

Figure 8:
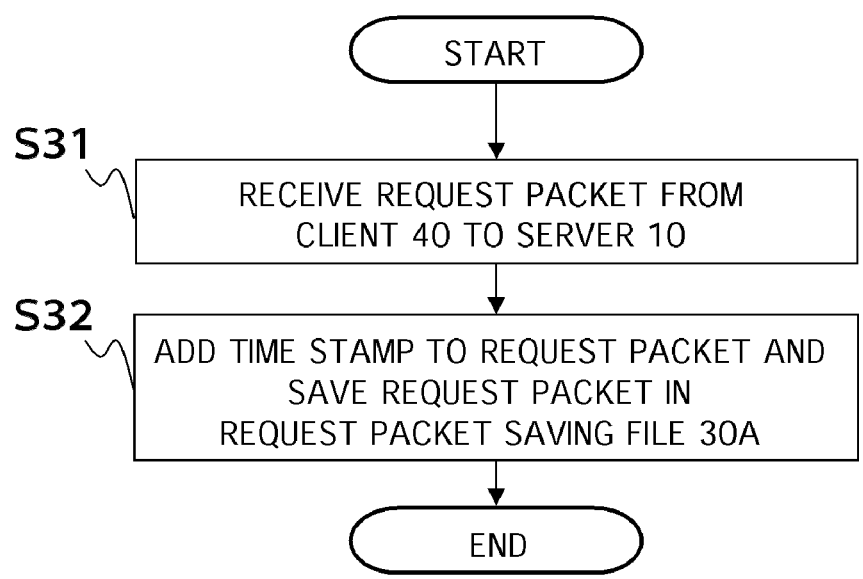
FIG. 8 is a flowchart illustrating first processing of the analyzer.

FIG. 8 illustrates the contents of first processing in the analyzer 30. The first processing in the analyzer 30 is executed every time the packet reception section 30C receives the request packet from the client 40 to the server 10 that has been port-mirrored by the switch 50.

In step 31, the packet reception section 30C receives the request packet from the client 40 to the server 10.

In step 32, the packet reception section 30C adds a time stamp indicating reception time to the received request packet and saves this in the request packet saving file 30A.

Figure 9:
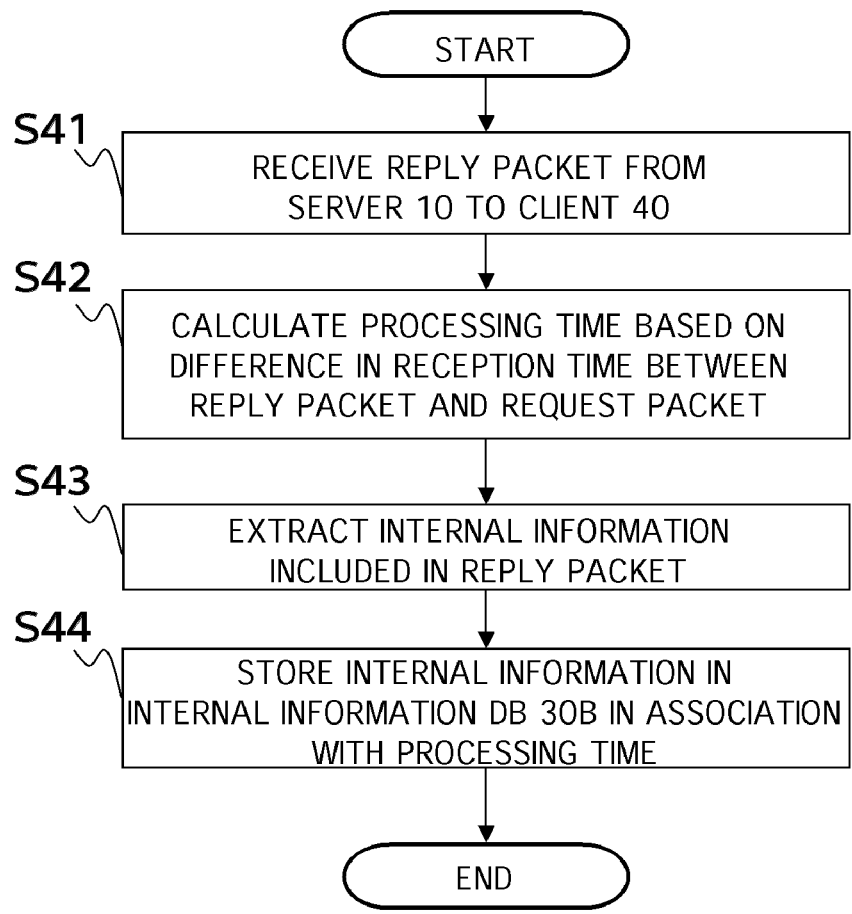
FIG. 9 is a flowchart illustrating second processing of the analyzer.

FIG. 9 illustrates the contents of second processing in the analyzer 30. The second processing in the analyzer 30 is executed every time the packet reception section 30C receives the reply packet from the server 10 to the client 40 that has been port-mirrored by the switch 50.

In step 41, the packet reception section 30C receives the reply packet from the server 10 to the client 40.

In step 42, the information storage section 30D acquires the request packet corresponding to the received reply packet together with the time stamp indicating the reception time, from the request packet saving file 30A. Then the information storage section 30D calculates the processing time performed by the server 10 and the server 20 in cooperation with each other, from a difference in the reception times between the reply packet and the request packet.

In step 43, the information storage section 30D extracts the internal information from the received reply packet.

In step 44, the information storage section 30D stores the extracted internal information in the internal information DB 30B in association with the calculated processing time.

Figure 10:
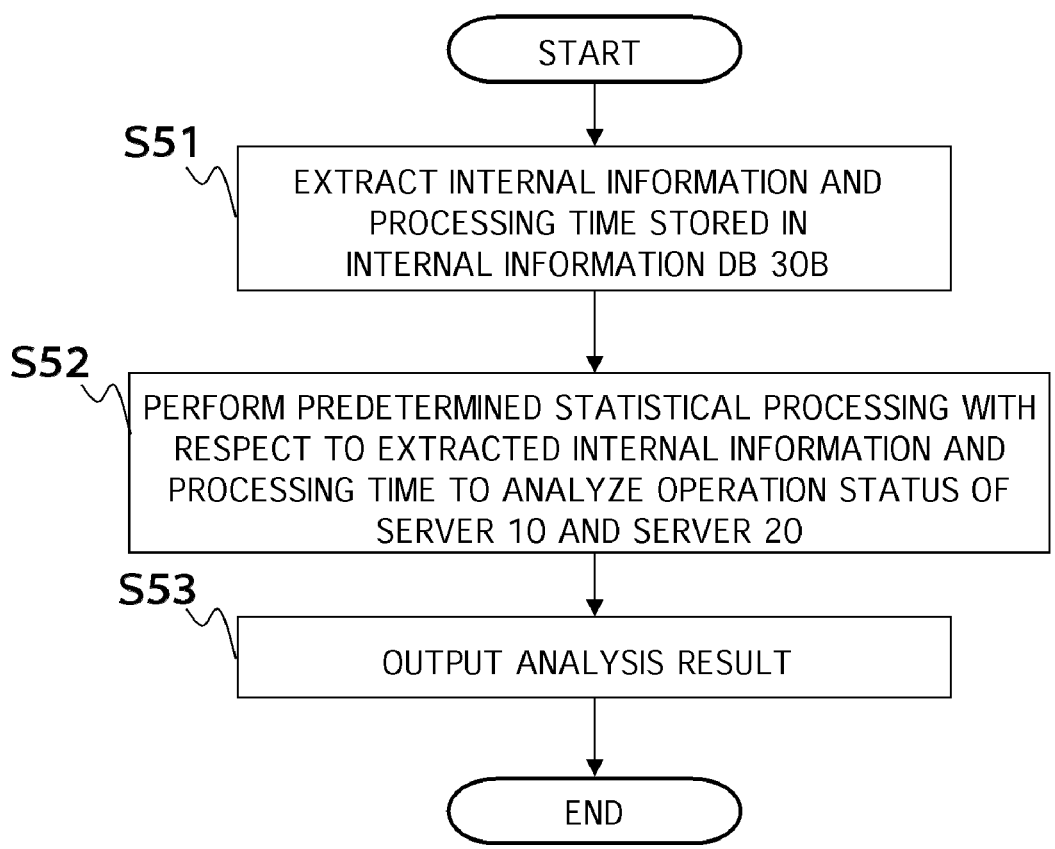
FIG. 10 is a flowchart illustrating third processing of the analyzer.

FIG. 10 illustrates the contents of third processing in the analyzer 30. The third processing in the analyzer 30 is executed by a scheduled job or an operation by a manager.

In step 51, the analysis section 30E extracts the internal information and the processing time stored in the internal information DB 30B in association with each other.

In step 52, the analysis section 30E performs predetermined statistical processing with respect to the extracted internal information and processing time, to analyze the operation status of the server 10 and the server 20.

In step 53, the analysis section 30E outputs an analysis result. As an output method, for example, the analysis result can be displayed on a display, or printed out on a paper medium or the like.

Here the predetermined statistical processing in the third processing in the analyzer 30 will be explained in more detail, assuming as an example a case in which the write processing or the read processing of 8 KB data is performed with respect to the memory in the server 10 and the server 20 in response to a processing request from the client 40. Here, (1) an example in which the contents of processing corresponding to the processing request in each server and the processing time of these contents are added to the reply packet, and (2) an example in which the contents of the kernel state in each server are added to the reply packet, are respectively explained.

(1) Example in which Contents of Processing Corresponding to Processing Request in Each Server and Processing Time of these Contents are Added to Reply Packet In this example, it is assumed that for each of the write processing and the read processing executed in the server 10 and the server 20 in cooperation with each other, the processing time (units: microseconds, μs) of; disk IO (disk input and output) processing, lock waiting processing, metadata update processing, and protocol generating processing is collected, as the contents of the processing and the processing time of these contents.

At this time, the respective pieces of internal information at the time of executing the write processing and the read processing added to the reply packet, which is returned from the server 10 to the client 40 and port-mirrored to be transmitted to the analyzer 30, have a structure illustrated in FIG. 11 and FIG. 12, respectively, through the processing in the server 10 and the server 20.

Figure 13:
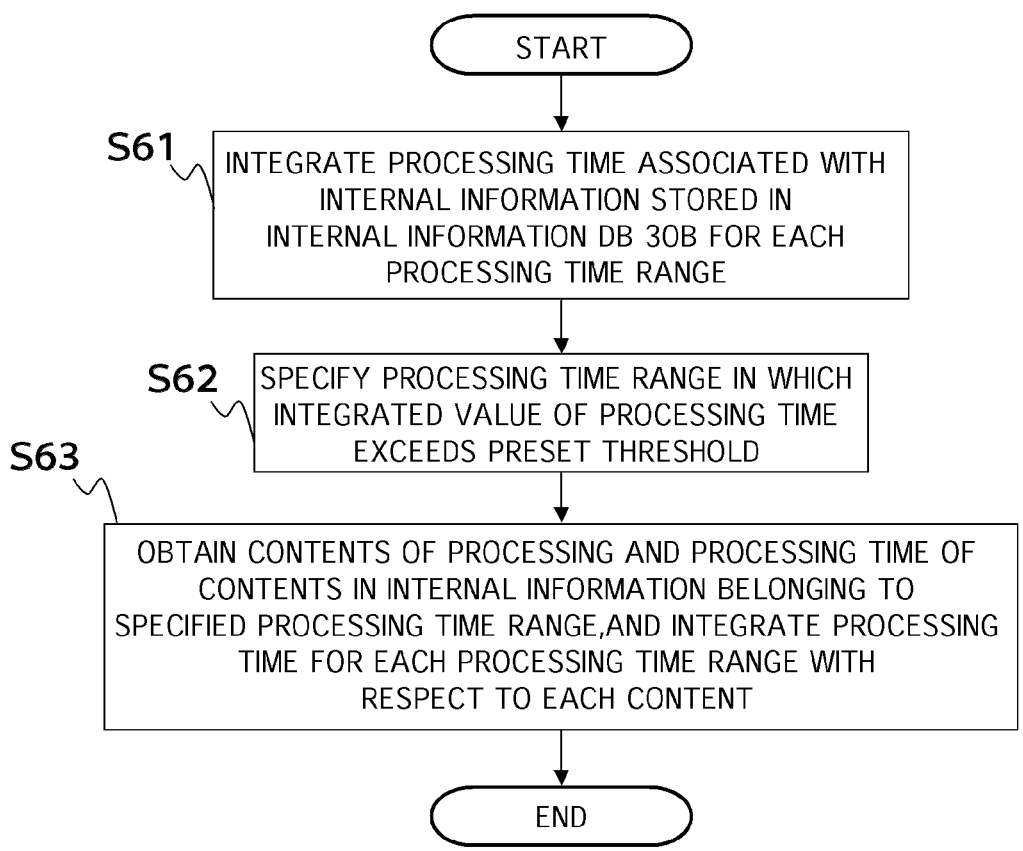
FIG. 13 is a flowchart illustrating the third processing of an analyzer 30 in an example of collecting contents of the processing and the processing time thereof.

FIG. 13 illustrates the contents of the statistical processing executed, respectively, for the write processing and the read processing by the analyzer 30, based on the contents of the processing and the processing time of the contents included in the internal information extracted from these reply packets and stored in the internal information DB 30B.

In step 61, the internal information stored in the internal information DB 30B is sorted by each processing time range divided up by a predetermined rule (for example, by units of 10 ms or the like) corresponding to the processing time associated with the internal information. The predetermined rule corresponds to a first predetermined rule, and a value thereof can be arbitrarily set. Then the total processing time (integrated value) is calculated for each processing time range by integrating the processing time associated with the sorted internal information.

In step 62, a processing time range out of the divided up processing time range, having a proportion at which the total processing time in the processing time range exceeds a preset threshold (for example, 10 percent or the like) of the total processing time in the whole processing time range is specified, based on the calculation result in step 61. Then the internal information belonging to the specified processing time range is set as an analysis target. The preset threshold can be arbitrarily set.

In step 63, the contents of the processing for each server and the processing time for each content, included in the internal information specified as the analysis target in step 62 are extracted. Furthermore, the contents of the processing are sorted for each processing time range divided up by the predetermined rule (for example, by units of 10 ms or the like), corresponding to the processing time of the contents. Then the total processing time (integrated value) is calculated by integrating the processing time of the sorted contents for each processing time range. The predetermined rule corresponds to a second predetermined rule, and a value thereof can be arbitrarily set.

In the above step 62, the total processing time is calculated by integrating the processing time associated with the internal information belonging to each processing time range. However the total number of pieces of the internal information can be calculated by integrating the number of cases of the internal information belonging to each processing time range. In this case, the internal information belonging to the processing time range in which the proportion that the total number of pieces of the internal information in each processing time range accounts for with respect to the number of pieces of the internal information in the total processing time range, is larger than a threshold, becomes the analysis target.

Moreover in step 63, the total processing time is calculated by integrating the processing time of the contents of the processing belonging to each processing time range. However the total number of pieces of the internal information can be calculated by integrating the number of contents of the processing belonging to the respective processing time ranges.

Figure 14:
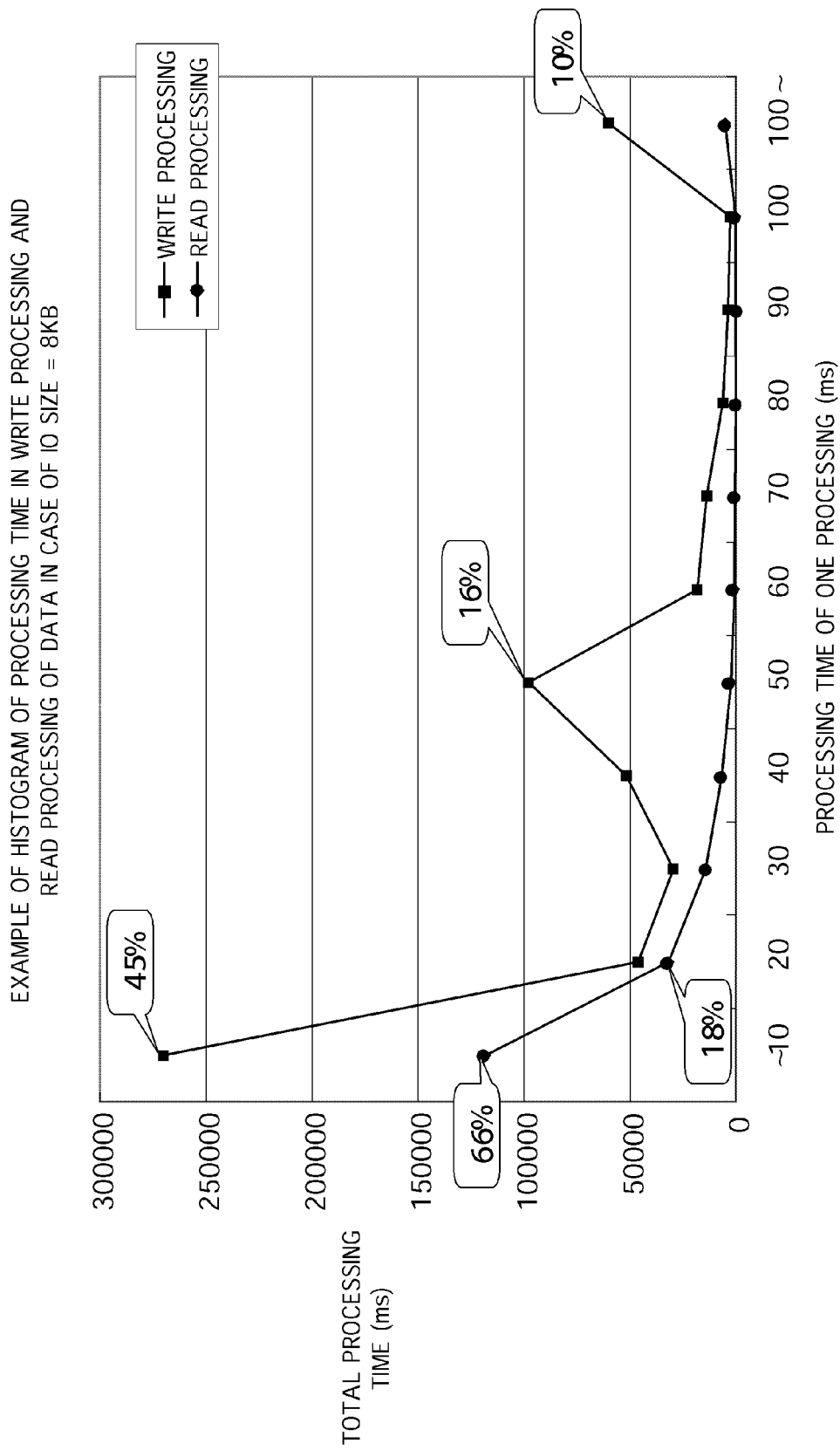
FIG. 14 is an explanatory drawing of a histogram expressing a relation between the processing time of one processing and total processing time.
Figure 15:
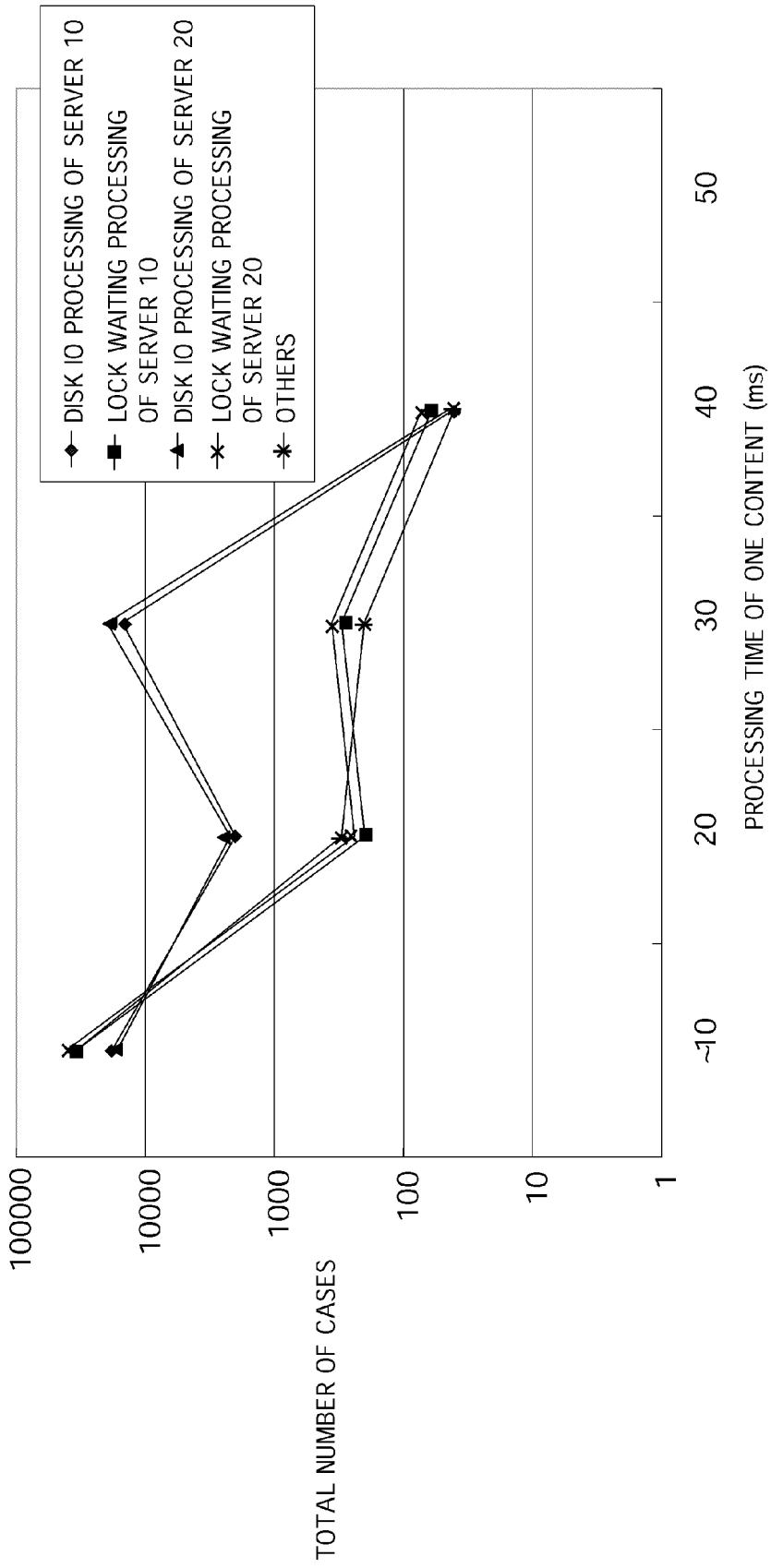
FIG. 15 is an explanatory drawing of a histogram expressing a relation between the processing time of contents of the processing in a case of write processing 50 ms and total number of processing.

FIG. 14 illustrates an example of a histogram as an execution result in step 61, indicating a relation between the processing time of one processing and the total processing time obtained by integrating the processing time associated with the internal information sorted for each processing time range, for each of the write processing and the read processing. Here percentage displayed in the histogram indicates the proportion that the total processing time in each processing time range accounts for in the total processing time in the whole processing time range. This value can be calculated by dividing the total processing time in each processing time range by the total processing time in the whole processing time range. In a case where the threshold is preset to 10%, focusing on the analysis result of the write processing, it is seen that the proportion that the total processing time associated with the internal information accounts for in the total number of pieces of the internal information exceeds 10% in the case where the processing time range is equal to or shorter than 10 ms, is 50 ms, and is equal to or longer than 100 ms. Moreover, based on this result, FIG. 15 illustrates one example of the histogram as the execution result in step 63, indicating a relation between the processing time of one contents and the total number of pieces of the internal information obtained by integrating the number of contents sorted for each processing time range. This histogram indicates a case where the processing time of the write processing is 50 ms. As is seen from the histogram, the number of pieces of the internal information requiring certain processing time in the disk IO processing of the server 10 and the disk IO processing of the server 20 particularly increases as compared with other processing (cases where processing time is 30 ms). Accordingly, when the processing time of the write processing is 50 ms, it can be presumed that there is a possibility that the disk IO processing of the server 10 and the disk IO processing of the server 20 have become a bottleneck.

(2) Example in which Kernel Information in Each Server is Added to Reply Packet

In this example, for each of the write processing and the read processing in the server 10 and the server 20, the number of empty threads, the number of empty queues, and the number of IO waiting are collected as the internal information.

At this time, the respective pieces of internal information at the time of executing the write processing and the read processing added to the reply packet, which is returned from the server 10 to the client 40 and port-mirrored to be transmitted to the analyzer 30, have a structure illustrated in FIG. 16 and FIG. 17, respectively, through the processing in the server 10 and the server 20.

Figure 18:
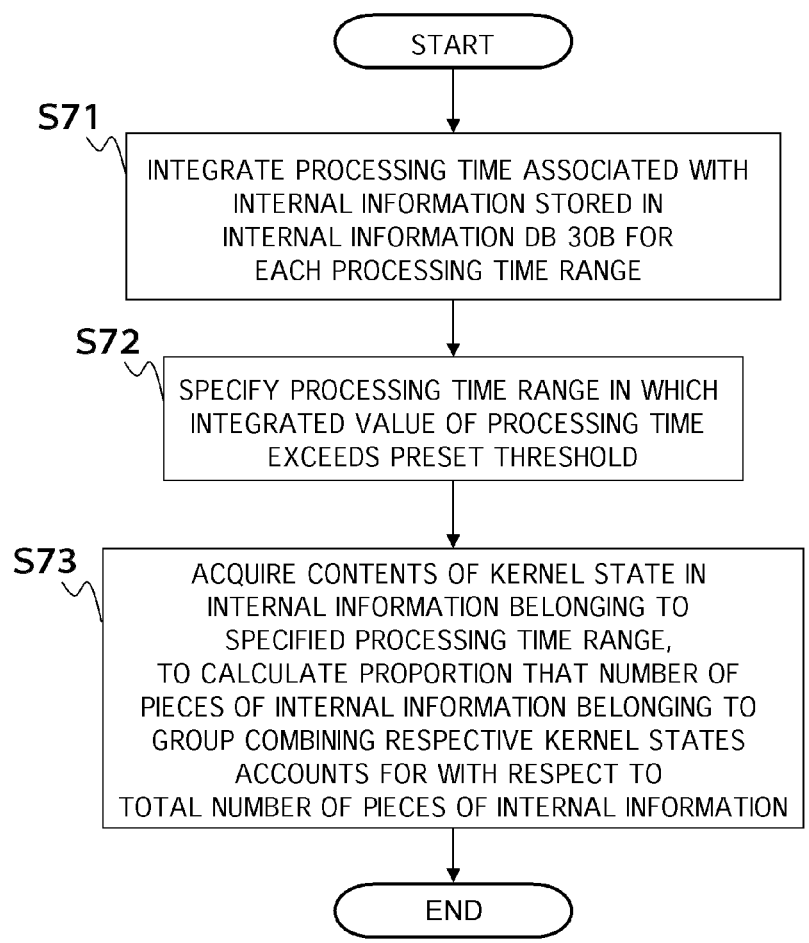
FIG. 18 is a flowchart of the third processing of the analyzer in an example of collecting the kernel information.

FIG. 18 explains in more detail the statistical processing executed by the aforementioned analyzer 30, based on the information of the processing time for each content added to the reply packet.

Since steps 71 and 72 are the same processing as the respective aforementioned steps 61 and 62, explanation thereof is omitted.

In step 73, the contents of the kernel state of the internal information extracted in step 72, that is, the number of empty threads, the number of empty queues, and the number of IO waiting are extracted. Moreover the proportion that the number of pieces of internal information belonging to each group combining the number of empty threads, the number of empty queues, and the number of IO waiting of the respective servers accounts for with respect to the number of all pieces of internal information serving as the analysis target is calculated. The combination of the number of empty threads, the number of empty queues, and the number of IO waiting of the respective servers can be arbitrarily set. For example, a case where when the number of threads of the server 10 is 0 and the number of empty queues is 0, while the number of IO waiting is not 0, the same state also occurs in the server 20, can be set as one group. Moreover, as another group, a combination of the server 10 with the number of IO waiting being 0 and the server 20 with the number of IO waiting being 0 can be set as one group. According to the kernel state of the internal information, all the combinations that can be obtained from the contents can be grouped, respectively. A rule defining the combination group corresponds to the predetermined rule.

FIG. 19 indicates one example of a table in which the proportion that the number of pieces of internal information belonging to each group of the combination of the number of empty threads, the number of empty queues, and the number of IO waiting of the server 10 and the server 20 accounts for in the total number of pieces of the internal information is calculated. As is seen from this table, the proportion in the case of the number of IO waiting of the server 10 being 1-50, the number of empty threads of the server 20 being 1-10, and the number of empty queues thereof being 1-20 is 61 percent, and the proportion accounting for the total number of pieces of the internal information is large. Therefore, in the case where the processing time in the write processing is 50 ms, it can be presumed that such an operation status becomes a bottleneck in the processing of the server 10 and the server 20.

By the processing executed by the analyzer 30, the internal information including the information indicating the operation status of the respective servers in the processing with respect to one processing request is extracted from the reply packet. Therefore, the operation status compositively occurring in each server in the processing with respect to one processing request can be specified. Moreover, the processing time performed by the server 10 and the server 20 in cooperation with each other is calculated for each processing corresponding to each processing request, from a difference in the time stamps of the request packet and the reply packet. Furthermore since the calculated processing time is associated with the internal information of the server 10 and the server 20 in the processing, for each processing with respect to each processing request, the operation status of the respective servers can be specified for each time period required for the processing.

Moreover, these pieces of the internal information and the processing time are stored, and the stored internal information is sorted for each processing time range divided up by the predetermined rule according to the processing time associated therewith. Furthermore, for each processing time range, the total processing time obtained by integrating the processing time associated with the internal information belonging to the processing time range or the total number of pieces of the internal information is calculated. Then the processing time range, in which the proportion that the total processing time or the total number of cases accounts for with respect to the total processing time or the total number of cases in the whole processing time range exceeds the predetermined threshold, is specified, and the internal information belonging to the processing time range is made the analysis target. Accordingly, when the processing time associated with the stored internal information concentrates within a certain range, the processing time range is specified, and the internal information belonging to the processing time range can be specified as the analysis target. At this time, when the proportion is calculated based on the total processing time, than as the processing time of one processing becomes long, that is, as a delay occurs, the proportion that the total processing time of the internal information belonging to the processing time range accounts for with respect to the total processing time of the whole processing time range tends to increase. Accordingly, the processing time range including a delay can be easily specified.

Moreover in the statistical processing in the above-mentioned example (1), the contents of the processing are further sorted for each processing time range corresponding to the processing time of the contents of the processing, with respect to the internal information serving as the analysis target belonging to the specified processing time range. Then the total processing time or the total number of contents calculated by integrating the processing time of the contents is calculated for each content of the processing. Therefore, tendencies as to how much of the processing time is consumed for each content of the processing in each servers in the processing belonging to the processing time range serving as the analysis target can be specified.

Furthermore in the statistical processing in the above-mentioned example (2), the proportion that the number of pieces of internal information belonging to each group combining the contents of the kernel state accounts for with respect to the number of all pieces of internal information serving as the analysis target is calculated for the internal information serving as the analysis target belonging to the specified processing time range. Accordingly, tendencies as to the kernel state of the respective servers in the processing with the processing time thereof belonging to the specified processing time range can be specified.

In this manner, since the analysis result obtained by applying the statistical processing is output, a tendency as to how the operation status compositively occurs between the respective computers corresponding to the processing time can be ascertained when one processing is performed by a plurality of computers in cooperation with each other. Moreover, the manager can ascertain in detail the operation status compositively occurring in the respective servers, when the processing time of the processing performed by the plurality of servers in cooperation with each other belongs to a certain specific range. At this time, if the internal information belonging to the processing time range including a delay is specified as the analysis target, a cause of the delay in each server in the processing, which has required the processing time, can be ascertained. Accordingly, when the processing is performed by the plurality of servers in cooperation with each other, the manager can determine and set an appropriate distribution of function and load performed between the respective servers.

In the system, the analyzer 30 receives the reply packet returned from the server 10 to the client 40 by port-mirroring, to analyze the operation status of the server 10 and the server 20. However, the configuration is not limited thereto, and for example, the client 40 can analyze the operation status based on the internal information added to the reply packet received from the server 10. According to such a configuration, no additional computer is needed to be introduced as the analyzer, and hence, the configuration of the system can be simplified. Moreover in this case, port-mirroring by the switch 50 is not required.

Figure 20:
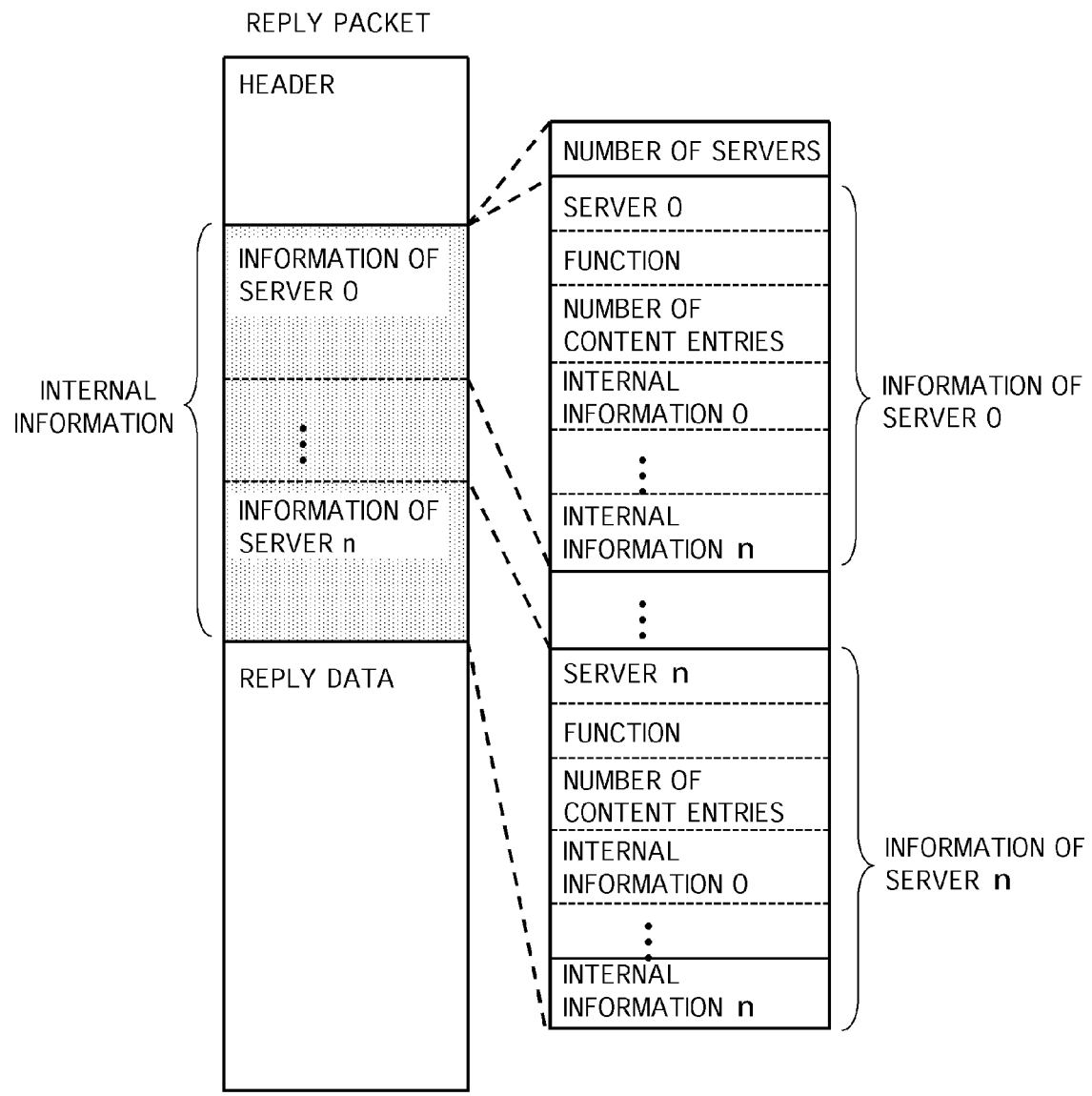
FIG. 20 is an explanatory drawing of a structure (including detailed structure of the internal information) of the reply packet.

Furthermore in the system described herein, the processing is distributed between two servers, and the respective servers add the information indicating the operation status of their own apparatus to the reply packet. However, the number of servers for distributing the processing can be further increased. In this case, in the respective servers distributed with the processing, the same processing as that of the server 20 is performed in the respective servers that perform processing in cooperation with each other, that is, the reply packet to which is added the internal information of its own apparatus is returned to a distribution source that has distributed the processing to its own apparatus. Moreover, in the server that returns the reply packet to the client 40, the reply packet to which is added the internal information of all the servers that have performed the processing in cooperation with each other is returned to the client 40. Here, FIG. 20 illustrates a configuration example of the reply packet in the case where the information indicating the operation status of server 0 to server n is collected. In this manner, the information indicating the operation status of a plurality of servers can be added to the header of one reply packet as the internal information, regardless of the number of servers. Then the analyzer 30 performs analysis by using the reply packet.

Furthermore one reply packet may be provided with the contents of the processing corresponding to the processing request in each server and the processing time of the contents, and the information indicating the kernel state in each server.

As is clear from the structure of the internal information in the reply packet illustrated in FIG. 4 and FIG. 20, in the present system, the type and the number of contents in the internal information added to one reply packet are not particularly limited. By adopting such a configuration, various processing can be analyzed. Moreover, one type of processing executed by each server can be analyzed multilaterally.

Furthermore in the explanation described above, an example in which the internal information of the server is added to the reply packet in order to analyze the state of the server in the client server system is illustrated. However the configuration is not limited to such a system configuration. For example, in a multi-node storage in which data is distributed to storages at a plurality of nodes and stored, the internal information of each node is respectively added to the reply packet to be transferred between the respective nodes, and the reply packet can be port-mirrored to the analyzer. Moreover the analyzer can analyze the state of each node based on the internal information added to the received reply packet.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer readable medium storing a supporting program causing a computer to execute a process for analyzing computer operation status, the process comprising:
   calculating processing time required from transmission of a request packet including one processing request, until return of a reply packet in which internal information of a plurality of computers is added to an execution result obtained by the plurality of computers which executed the processing corresponding to the processing request in cooperation with each other, wherein the internal information includes a plurality of information each of which indicates an operation status of each of the plurality of computers during processing corresponding to the processing request;
   extracting the internal information of the plurality of computers from the reply packet;
   storing the executed internal information in association with the calculated processing time, in a memory;
   analyzing the operation status of each of the plurality of computers by performing predetermined statistical processing with respect to the internal information and the processing time associated with the internal information stored in the memory, to thereby obtain a result of analysis; and
   outputting the result of analysis,
   wherein the request packet is generated in port-mirroring of a request packet which is transmitted from a client computer to the plurality of computers, and the reply packet is generated in port-mirroring of a reply packet which is returned from the plurality of computers to the client computer,
   wherein the internal information includes contents of a kernel state of the plurality of computers at the time of executing the processing, and wherein the process of analyzing the operation status comprising: calculating a proportion that the number of pieces of internal information belonging to each group combining the contents of the kernel state of the internal information stored in the memory by a predetermined rule accounts for with respect to the number of all pieces of internal information as an analysis target.

2. A non-transitory computer readable medium storing a supporting program causing a computer to execute a process for analyzing computer operation status according to claim 1, wherein the process of analyzing the operation status comprising:
   designating, as an analysis target, the internal information belonging to a processing time range divided up by a first predetermined rule in which a proportion that an integrated value of the processing time associated with the internal information belonging to each processing time range accounts for with respect to an integrated value of the processing time associated with the internal information in the whole processing time range is larger than a predetermined threshold.

3. A non-transitory computer readable medium storing a supporting program causing a computer to execute a process for analyzing computer operation status according to claim 1, wherein the process of analyzing the operation status comprising:
   designating, as an analysis target, the internal information belonging to a processing time range divided up by a first predetermined rule in which a proportion that the number of pieces of internal information belonging to each processing time range accounts for with respect to the number of pieces of internal information in the whole processing time range is larger than a predetermined threshold.

4. A non-transitory computer readable medium storing a supporting program causing a computer to execute a process for analyzing computer operation status according to claim 2,
   wherein the internal information includes information indicating detailed contents of the processing in each computer and processing time of each content, and
   wherein the process of analyzing the operation status comprising: calculating an integrated value of the processing time of the contents or the number of contents belonging to each processing time range divided up by a second predetermined rule for each content.

5. A non-transitory computer readable medium storing a supporting program causing a computer to execute a process for analyzing computer operation status according to claim 1, wherein
   the internal information includes the contents that are classified according to computer and function to be realized by the processing.

6. A supporting method for analyzing computer operation status, the supporting method executed in a computer, the method comprising:
   calculating processing time required from transmission of a request packet including one processing request, until return of a reply packet in which internal information of a plurality of computers is added to an execution result obtained by the plurality of computers which executed the processing corresponding to the processing request in cooperation with each other, wherein the internal information includes a plurality of information each of which indicates an operation status of each of the plurality of computers during processing corresponding to the processing request;
   extracting the internal information of the plurality of computers from the reply packet;
   storing the extracted internal information in association with the calculated processing time, in a memory;
   analyzing the operation status of each of the plurality of computers by performing predetermined statistical processing with respect to the internal information and the processing time associated with the internal information stored in the memory, to thereby obtain a result of analysis; and
   outputting the result of analysis,
   wherein the request packet is generated in port-mirroring of a request packet which is transmitted from a client computer to the plurality of computers, and the reply packet is generated in port-mirroring of a reply packet which is returned from the plurality of computers to the client computer,
   wherein the internal information includes contents of a kernel state of the plurality of computers at the time of executing the processing, and
   wherein the process of analyzing the operation status comprising: calculating a proportion that the number of pieces of internal information belonging to each group combining the contents of the kernel state of the internal information stored in the memory by a predetermined rule accounts for with respect to the number of all pieces of internal information as an analysis target.

7. A supporting apparatus for analyzing computer operation status, the supporting apparatus comprising:
   a calculation device that calculates processing time required from transmission of a request packet including one processing request, until return of a reply packet in which internal information of a plurality of computers is added to an execution result obtained by the plurality of computers which executed the processing corresponding to the processing request in cooperation with each other, wherein the internal information includes a plurality of information each of which indicates an operation status of each of the plurality of computers during processing corresponding to the processing request;
   an extraction device that extracts the internal information of the plurality of computers from the reply packet;
   a storage device that stores the internal information extracted by the extraction device in association with the processing time calculated by the calculation device, in a memory;
   an analysis device that analyzes the operation status of each of the plurality of computers by performing predetermined statistical processing with respect to the internal information and the processing time associated with the internal information stored in the memory by the storage device, to thereby obtain a result of analysis; and
   an output device that outputs the result of analysis performed by the analysis device,
   wherein the request packet is generated in port-mirroring of a request packet which is transmitted from a client computer to the plurality of computers, and the reply packet is generated in port-mirroring of a reply packet which is returned from the plurality of computers to the client computer,
   wherein the internal information includes contents of a kernel state of the plurality of computers at the time of executing the processing, and
   wherein the process of analyzing the operation status comprising: calculating a proportion that the number of pieces of internal information belonging to each group combining the contents of the kernel state of the internal information stored in the memory by a predetermined rule accounts for with respect to the number of all pieces of internal information as an analysis target.

8. A non-transitory computer readable medium storing a supporting program causing a computer to execute a process for analyzing computer operation status, the process comprising:
calculating processing time required from transmission of a request packet including one processing request, until return of a reply packet in which internal information of a plurality of computers is added to an execution result obtained by the plurality of computers which executed the processing corresponding to the processing request in cooperation with each other, wherein the internal information includes a plurality of information each of which indicates an operation status of each of the plurality of computers during processing corresponding to the processing request;
extracting the internal information of the plurality of computers from the reply packet;
storing the executed internal information in association with the calculated processing time, in a memory;
analyzing the operation status of each of the plurality of computers by performing predetermined statistical processing with respect to the internal information and the processing time associated with the internal information stored in the memory, to thereby obtain a result of analysis; and
outputting the result of analysis,
wherein the internal information includes contents of a kernel state of the plurality of computers at the time of executing the processing, and
wherein the process of analyzing the operation status comprising:
designating, as an analysis target, the internal information belonging to a processing time range divided up by a first predetermined rule in which a proportion that an integrated value of the processing time associated with the internal information belonging to each processing time range accounts for with respect to an integrated value of the processing time associated with the internal information in the whole processing time range is larger than a predetermined threshold; and
calculating a proportion that the number of pieces of internal information belonging to each group combining the contents of the kernel state of the internal information stored in the memory by a predetermined rule accounts for with respect to the number of all pieces of internal information as the analysis target.

9. A non-transitory computer readable medium storing a supporting program causing a computer to execute a process for analyzing computer operation status according to claim 8,
wherein the internal information includes information indicating detailed contents of the processing in each computer and processing time of each content, and
wherein the process of analyzing the operation status comprising: calculating an integrated value of the processing time of the contents or the number of contents belonging to each processing time range divided up by a second predetermined rule for each content.

10. A non-transitory computer readable medium storing a supporting program causing a computer to execute a process for analyzing computer operation status according to claim 8,
wherein the internal information includes the contents that are classified according to computer and function to be realized by the processing.

11. A supporting method for analyzing computer operation status, the supporting method executed in a computer, the method comprising:
calculating processing time required from transmission of a request packet including one processing request, until return of a reply packet in which internal information of a plurality of computers is added to an execution result obtained by the plurality of computers which executed the processing corresponding to the processing request in cooperation with each other, wherein the internal information includes a plurality of information each of which indicates an operation status of each of the plurality of computers during processing corresponding to the processing request;
extracting the internal information of the plurality of computers from the reply packet;
storing the extracted internal information in association with the calculated processing time, in a memory;
analyzing the operation status of each of the plurality of computers by performing predetermined statistical processing with respect to the internal information and the processing time associated with the internal information stored in the memory, to thereby obtain a result of analysis; and
outputting the result of analysis,
wherein the internal information includes contents of a kernel state of the plurality of computers at the time of executing the processing, and
wherein the analyzing the operation status comprising:
designating, as an analysis target, the internal information belonging to a processing time range divided up by a first predetermined rule in which a proportion that an integrated value of the processing time associated with the internal information belonging to each processing time range accounts for with respect to an integrated value of the processing time associated with the internal information in the whole processing time range is larger than a predetermined threshold; and
calculating a proportion that the number of pieces of internal information belonging to each group combining the contents of the kernel state of the internal information stored in the memory by a predetermined rule accounts for with respect to the number of all pieces of internal information as the analysis target.

12. A supporting apparatus for analyzing computer operation status, the supporting apparatus comprising:
a calculation device that calculates processing time required from transmission of a request packet including one processing request, until return of a reply packet in which internal information of a plurality of computers is added to an execution result obtained by the plurality of computers which executed the processing corresponding to the processing request in cooperation with each other, wherein the internal information includes a plurality of information each of which indicates an operation status of each of the plurality of computers during processing corresponding to the processing request;
an extraction device that extracts the internal information of the plurality of computers from the reply packet;
a storage device that stores the internal information extracted by the extraction device in association with the processing time calculated by the calculation device, in a memory;
an analysis device that analyzes the operation status of each of the plurality of computers by performing predetermined statistical processing with respect to the internal information and the processing time associated with the internal information stored in the memory by the storage device, to thereby obtain a result of analysis; and an output device that outputs the result of analysis performed by the analysis device, wherein the internal information includes contents of a kernel state of the plurality of computers at the time of executing the processing, and wherein the analysis device designates, as an analysis target, the internal information belonging to a processing time range divided up by a first predetermined rule in which a proportion that an integrated value of the processing time associated with the internal information belonging to each processing time range accounts for with respect to an integrated value of the processing time associated with the internal information in the whole processing time range is larger than a predetermined threshold, and calculates a proportion that the number of pieces of internal information belonging to each group combining the contents of the kernel state of the internal information stored in the memory by a predetermined rule accounts for with respect to the number of all pieces of internal information as the analysis target.

* * * * *